(12) United States Patent
Xu et al.

(10) Patent No.: US 7,253,219 B2
(45) Date of Patent: Aug. 7, 2007

(54) FUNCTIONAL COMPOSITE MATERIAL USING SHAPE MEMORY ALLOY AND PRODUCTION METHOD THEREFOR

(75) Inventors: Ya Xu, Tsukuba (JP); Kazuhiro Otsuka, Tsukuba (JP); Nobuyuki Toyama, Toride (JP); Byungkoog Jang, Nagoya (JP); Teruo Kishi, Tokyo (JP)

(73) Assignee: National Institute of Advanced Industrial Science and Technology (JP)

( * ) Notice: Subject to any disclaimer, the term of this patent is extended or adjusted under 35 U.S.C. 154(b) by 483 days.

(21) Appl. No.: 10/478,967

(22) PCT Filed: Mar. 20, 2002

(86) PCT No.: PCT/JP02/02717

§ 371 (c)(1),
(2), (4) Date: Nov. 28, 2003

(87) PCT Pub. No.: WO02/097149

PCT Pub. Date: Dec. 5, 2002

(65) Prior Publication Data

US 2004/0176516 A1     Sep. 9, 2004

(30) Foreign Application Priority Data

May 29, 2001   (JP) .............................. 2001-159786

(51) Int. Cl.
*C08L 63/00*   (2006.01)
*C08K 3/10*   (2006.01)
(52) U.S. Cl. ..................... 523/400; 523/200; 524/435
(58) Field of Classification Search ................ 524/435; 523/200, 400
See application file for complete search history.

(56) References Cited

U.S. PATENT DOCUMENTS 5,641,364 A * 6/1997 Golberg et al. ............. 148/563
2002/0142119 A1* 10/2002 Seward et al. ............. 428/36.9

FOREIGN PATENT DOCUMENTS

| DE | 1 558 715 A | 8/1967 |
|---|---|---|
| DE | 33 22 598 A1 | 6/1983 |
| DE | 40 34 914 A1 | 10/1990 |
| DE | 100 28 693 A1 | 6/2000 |
| FR | 1 488 528 A | 8/1966 |
| JP | 6-212018 | 2/1994 |
| JP | 9-176330 | 8/1997 |
| JP | 9-317821 | 12/1997 |

* cited by examiner

*Primary Examiner*—Tae H. Yoon
(74) *Attorney, Agent, or Firm*—Bacon & Thomas, PLLC (57) ABSTRACT

A functional composite material characterized by being molded by solidifying by a resin base material a martensite-phase shape memory alloy wire produced by cold drawing a shape memory alloy which changes between an austenite phase and a martensite phase via a phase transformation temperature. The material enables a smooth motion memorized in the shape memory alloy.

4 Claims, 9 Drawing Sheets

FUNCTIONAL COMPOSITE MATERIAL USING SHAPE MEMORY ALLOY AND PRODUCTION METHOD THEREFOR

TECHNICAL FIELD

The present invention relates to a functional composite material using a shape memory alloy and a method of preparing same.

BACKGROUND ART

Several studies concerning application of functional composite materials using a shape memory alloy have been hitherto proposed. It is known that concentration of a stress in an epoxy resin may be relaxed by embedding therein pre-strained shape memory alloy wires therein.

It is also known that when pre-strained shape memory alloy wires are embedded in a matrix of CFRP, GFRP, Al, etc., the vibration controlling function and fatigue crack developing rate can be retarded (Japanese Published Unexamined Patent Application No. H09-317821, H06-264161, H07-48673, H06-212018, H09-176330, etc.).

The above known technique utilizes an effect that an elongation strain imparted to the wires in a low temperature martensite phase remains after the stress has been removed and that the wires undergoes reverse transformation into the original phase when heated after the molding so that the composite can restore the original shape.

However, the reverse transformation finishing temperature (Af) of currently widely used heat-treated NITINOL (Ti-50at % Ni) is 100° C. or lower, whereas a heat-resisting epoxy resin is thermally cured at a temperature of 130° C. or higher. Therefore, when such TiNi wires are embedded in a matrix such as CFRP, GFRP or an epoxy resin and molded by curing, the curing temperature exceeds the reverse transformation finishing temperature thereof. Thus, unless the pre-strained wires are fixed during the course of the thermal curing and molding, the wires will shrink so that the shape memory effect of the TiNi wires will be no longer available thereafter.

Accordingly, the current practice requires the use of a jig to fix opposite ends of the TiNi wires in order to retain the pre-strain during the curing of the CFRP, GFRP or epoxy resin in which the TiNi wires are embedded. Thus, the functional composite material using shape memory alloy wires poses a great problem in practice, because the size and shape thereof are considerably limited.

Also, in the case where a pre-strain is given to a shape memory alloy by drawing, the yield stress in the martensite phase is so low that there is caused a problem that an effect to increase the strengths and rigidity at low temperatures is insufficient.

The present invention provides a functional composite material using a shape memory alloy and a method of preparing same which are devoid of the above-mentioned defects, in which the reverse transformation temperature of TiNi wires is increased to a temperature higher than a curing temperature for a matrix material such as CFRP, GFRP or an epoxy resin by cold working of the TiNi wires, which permit the TiNi wires to be embedded in the resin without fixing both ends thereof, and which do not cause reverse transformation or shrinkage of the TiNi wires during the curing.

The present invention also provides a method of preparing a functional composite material in which the reverse transformation temperature of the TiNi wires are returned to the normal state by heating the TiNi wires by passing an electric current therethrough for a short time, and which permits the utilization of shape memory effect of the TiNi wires.

The present invention further provides a functional composite material using a shape memory alloy and a method of preparing same in which only wire drawing in a wire production process is utilized in the cold working to generate a pre-strain therein and to increase the reverse transformation temperatures thereof, which can significantly reduce the manufacturing costs, and which can increase the yield stress in the martensite phase of the TiNi wires by the cold working and, therefore, can expect an effect of increasing the strengths and rigidity thereof.

DISCLOSURE OF THE INVENTION

Figure 1:
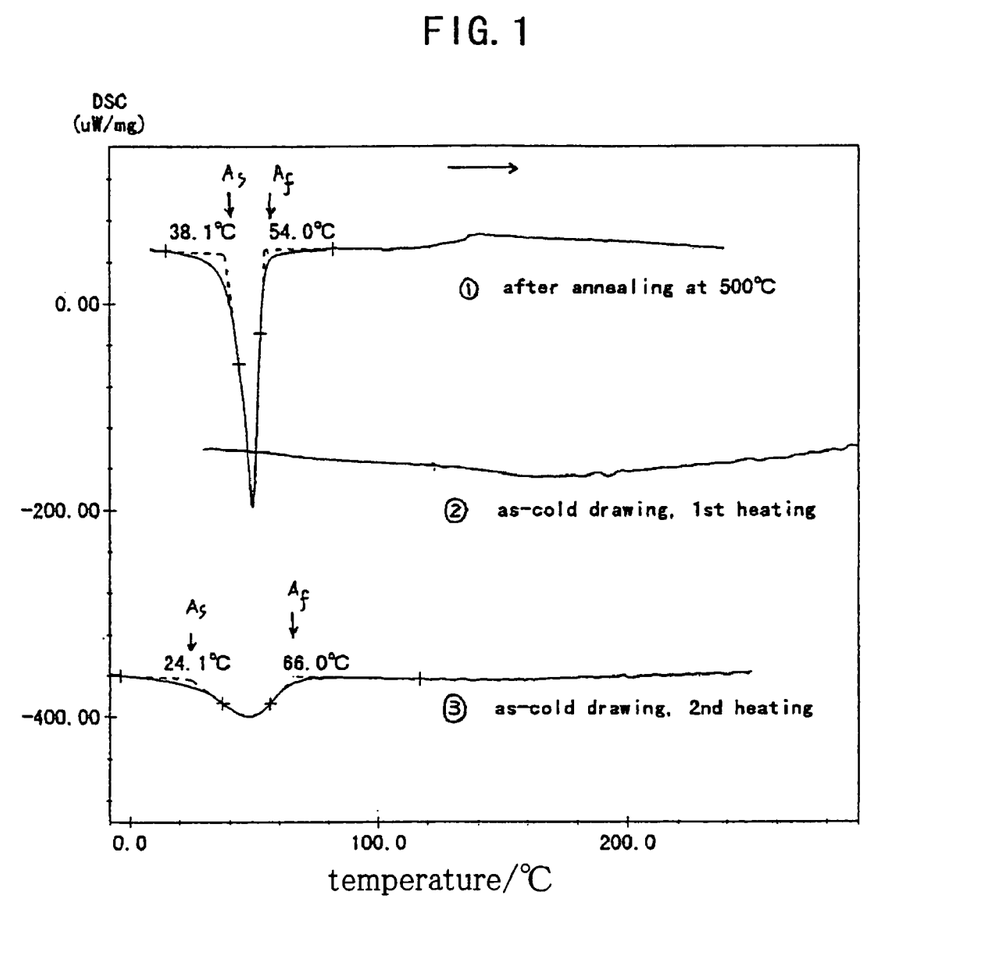
FIG. 1 shows the results of measurement, by a differential scanning thermometer, for reverse transformation temperature of Ti-50 at % Ni alloy. The curve ① shows the results of measurement for the reverse transformation temperature of a sample treated at 500° C. to have a straight memory; ② shows the results of measurement after a first time heating of a sample having the same composition and cold worked with a working rate of 35%; and ③ shows the results of measurement after a second time heating of the sample cold worked with a working rate of 35%.

The present inventors have invented a functional composite material and a method of preparing same, which utilize phenomena that a shape memory alloy capable of assuming a martensite phase or an austenite phase through phase transformation temperatures shows an increased reverse transformation temperature when cold worked and that the reverse transformation temperature is returned to the normal state when the alloy is reverse-transformed (FIG. 1).

In the typical specific embodiment, a cold drawing work of a TiNi shape memory alloy wire in a martensite phase with a cold drawing working rate of at least 10% or more, preferably about 35%, can generate a pre-strain therein and can increase the reverse transformation temperature thereof. Therefore, when such TiNi shape memory alloy wires are embedded in a matrix, such as CFRP, GFRP or an epoxy resin, and molded by thermal curing, a functional composite material has been found to be prepared without a need of devices and control for retaining a pre-strain of TiNi shape memory alloy wires, since the reverse transformation temperature is higher than the curing temperature.

TABLE 1

| | As (° C.) | Af (° C.) | Ms (° C.) | Mf (° C.) |
|---|---|---|---|---|
| Ti-49.54 at % Ni, CR20% | | | | |
| 1st cycle | 131.7 | 195.1 | 69.9 | 17.5 |
| 2nd cycle | 57.5 | 93.2 | 69 | 16.6 |
| Ti-49.54 at % Ni, CR35% | | | | |
| 1st cycle | 143.1 | 240.4 | 72.2 | 22 |
| 2nd cycle | 32.8 | 81.7 | 72.2 | 21.4 |
| Ti-50 at % Ni, CR20% | | | | |
| 1st cycle | 115.5 | 188.9 | 62.7 | 6.6 |
| 2nd cycle | 47.7 | 78.1 | 60.4 | 7.6 |
| Ti-50 at % Ni, CR35% | | | | |
| 1st cycle | 142.6 | — | 63.4 | — |
| 2nd cycle | 22.6 | 66 | 62.6 | — |
| Ti-50 at % Ni, CR63% | | | | |
| 1st cycle | 160 | — | — | — |
| Ti-50.5 at % Ni, CR35% | | | | |
| 1st cycle | 72.2 | — | — | — |

Table 1 shows reverse transformation temperatures, as measured by a differential scanning calorimeter (DSC), of alloys having compositions of Ti-49.54 at % Ni, Ti-50 at % Ni and Ti-50.5 at % Ni. As a result, it has been found that, in the case of Ti-49.54 at % Ni, the reverse transformation starting temperature is higher than 130° C. when the cold working rate is 20%. In the case of Ti-50 at % Ni, the reverse transformation starting temperature has been found to be higher than 130° C. when the cold working rate is 35%. On the other hand, in the case of Ti-50.5 at % Ni, the reverse transformation starting temperature has been found to increase to only 70° C. even when the cold working rate is 35%. The reverse transformation temperatures of these alloys have been found to significantly decrease, when they are subjected to second heating.

For instance, FIG. 1 shows the results of reverse transformation temperature measurement of Ti-50 at % Ni with a cold working rate of 35%. For comparison purpose, the results of reverse transformation temperature measurement of Ti-50 at % Ni treated to have a straight memory are shown together. After the first heating, the endothermic peak showing the reverse transformation temperature is very broad and shifted to a higher temperature side. After the second heating, on the other hand, the reverse transformation peak is sharp and the temperature range of transformation returns to the state similar to that of the non-cold-worked sample.

Figure 2:
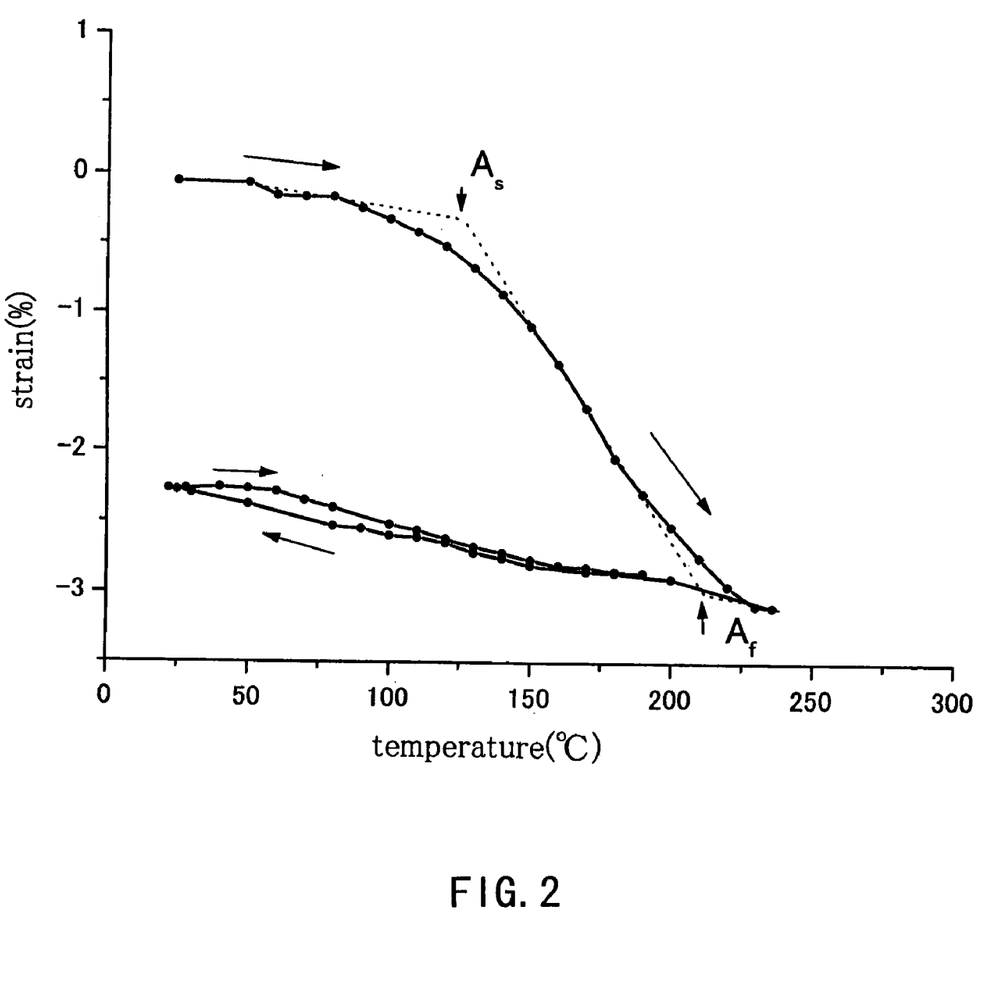
FIG. 2 shows the results of measurement, by thermal expansion measurement, for changes of shrinkage strain caused by reverse transformation of a Ti-50 at % Ni wire with a cold working rate of 35%.

Further, for the purpose of accurately determining the reverse transformation temperature of the cold worked alloy, thermal expansion measurement was carried out. Thus, FIG. 2 shows changes of shrinkage strain caused by reverse transformation, from which it is seen that the reverse transformation temperature range is greatly widened and extends from 120° C. to 210° C. The results of the measurement also indicate that the sample with a cold working rate of 35% gives a tensile pre-strain of about 2.3%.

BRIEF DESCRIPTION OF THE DRAWINGS

FIG. 5 is to demonstrate an effect of cold working to increase the strength and rigidity at room temperature, wherein FIG. 5(a) shows a stress-strain relationship measured by a tensile test of a sample wire, simulative of the conventional method, obtained by pre-straining a Ti-50 at % Ni alloy annealed at 500° C. to have a pre-strain of 2% and, thereafter, heating the alloy under constrained state, followed by cooling to room temperature, and FIG. 5(b) shows a stress-strain relationship measured by a tensile test at room temperature of a sample wire obtained by treating a Ti-50 at % Ni wire, having a cold working rate of 35% and the same composition as above, at 130° C. for 2 hours and, thereafter, heating the wire under constrained state by passing an electric current therethrough for a short time.

BEST MODE FOR CARRYING OUT THE INVENTION

The functional composite material and the method of preparing same have been invented on the basis of the results of the above-described studies. A method of preparing a functional composite material using a cold worked TiNi alloy wire will be specifically described below.

The present invention provides a method of obtaining a shape recovery force, comprising heating a cold worked, embedded TiNi alloy by passing an electric current therethrough.

There is a problem that unless the wire embedded and constrained in a matrix is reverse-transformed, the reverse transformation temperature is not returned to the normal state and such a recovery force cannot be utilized.

In order to reverse-transform a cold worked sample, however, it is necessary to heat the sample to a reverse transformation finishing temperature (which is about 210° C. when the cold working rate is 35%). Since this temperature is higher than the curing temperature of the matrix, there is a fear that the properties of the matrix are adversely affected during the heating.

The present inventors have developed a special heating method utilizing the fact that the reverse transformation is an endothermic reaction.

Specifically, an embedded TiNi wire is once heated for a very short time by passing a large electric current therethrough. The supply of the electric current is immediately stopped. In this case, since the reverse transformation is an endothermic reaction and since the supply of the electric current is stopped generally within 10 seconds, preferably within 5 seconds, before the temperature in a region adjacent to the wire surface is not increased, an influence of the heat upon the matrix surrounding the wire is small. By this heat treatment, the reverse transformation temperature of the TiNi wire returns to the normal state. Recovery force is then obtainable by heating with a small electric current.

Figure 3:
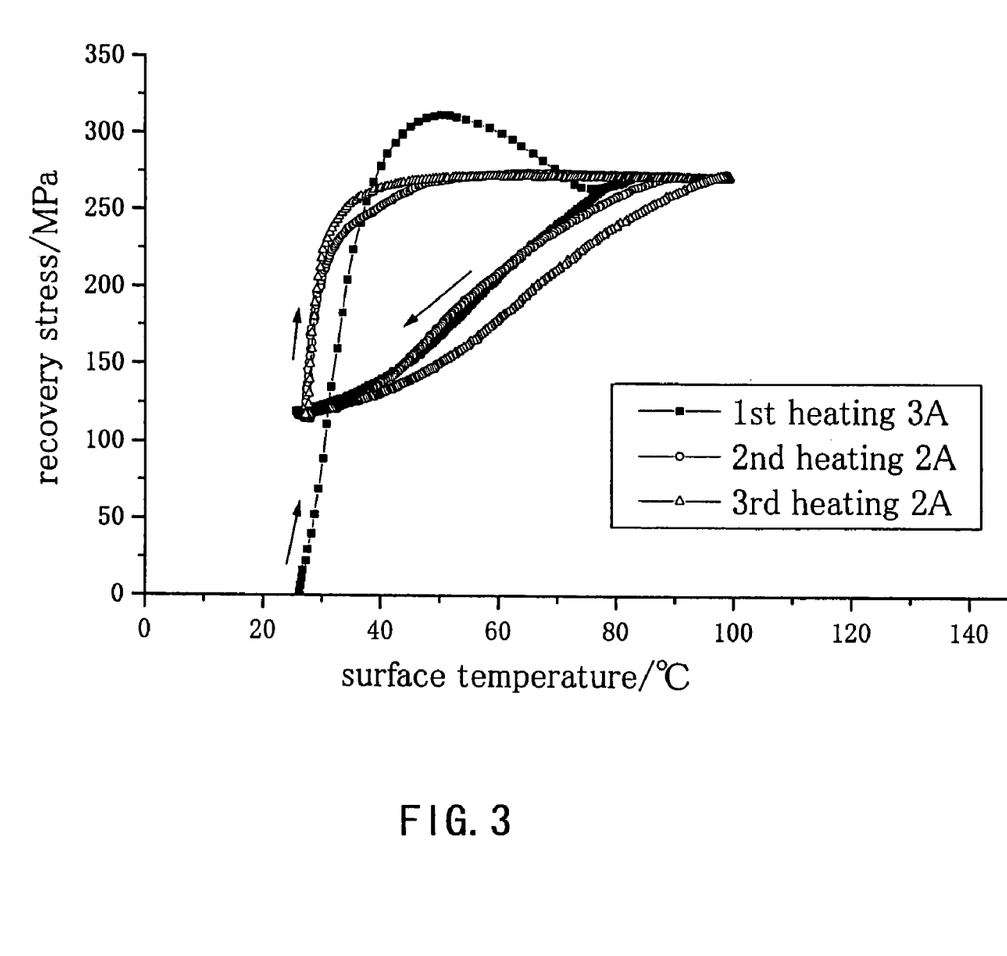
FIG. 3 shows the results of measurement for recovery stress and wire surface temperature of a Ti-50 at % Ni wire with a cold working rate of 35% during the heating of the wire by passing an electric current and the cooling of the wire after stopping the current, while constraining the wire.
Figure 4:
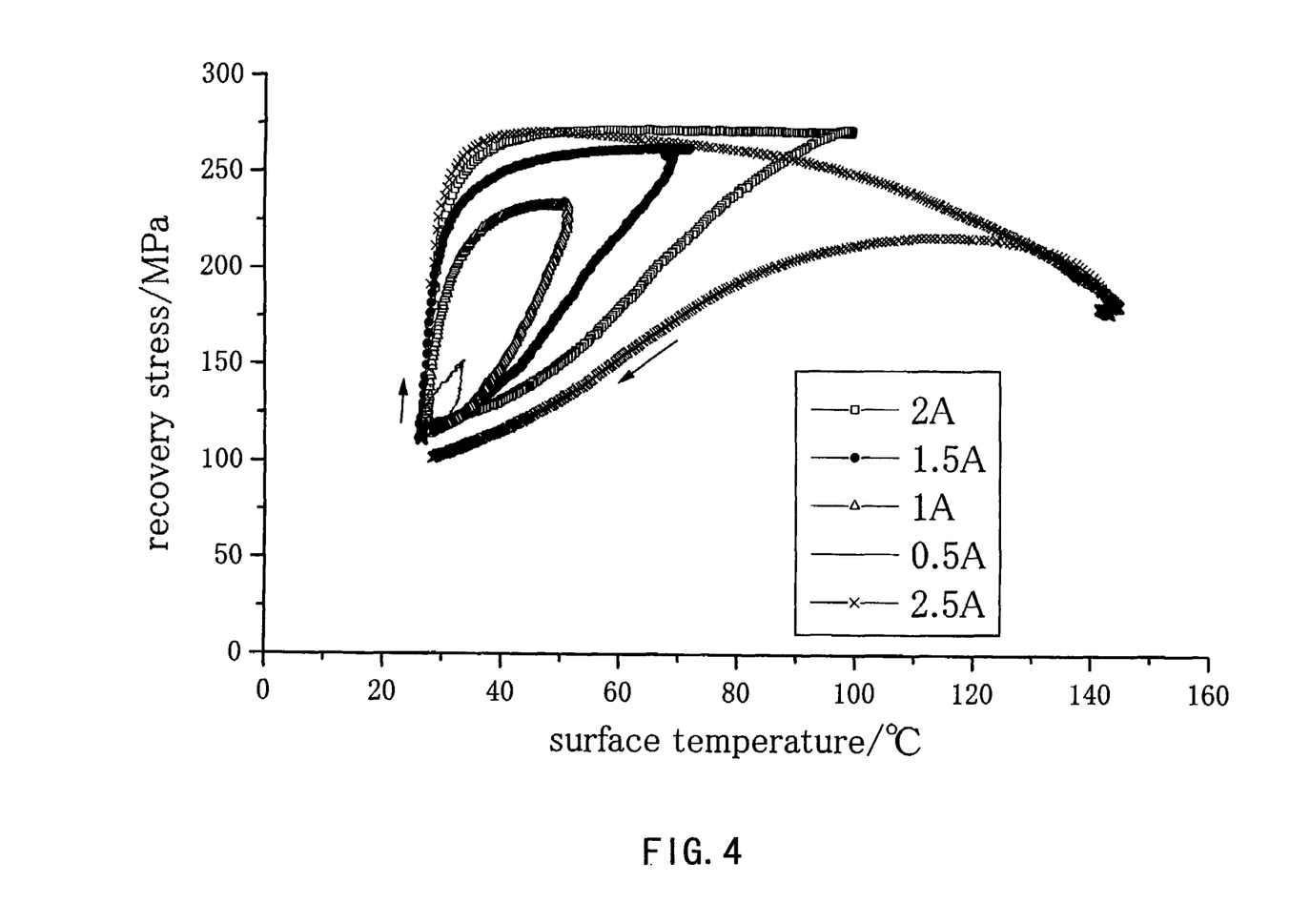
FIG. 4 shows the results of measurement for recovery stress and wire surface temperature of a Ti-50 at % Ni wire with a cold working rate of 35% during the heating of the wire by passing various electric currents and the cooling of the wire after stopping the currents, the heating at various electric currents being carried out after the wire had been heated by passing an electric current of 3 A for 4 seconds.

For example, FIG. 3 shows the results of measurement for recovery stress and wire surface temperature of a Ti-50 at % Ni wire (diameter: 0.4 mm) with a cold working rate of 35% during the heating of the wire by passing an electric current, while constraining the wire. In the first time heating, a current of 3 A was passed for 4 seconds. In this case, the maximum temperature of the wire surface is found to be not higher than 100° C.

When the second and third heating were each carried out by passing a current of 2 A, a constant recovery force was found to be obtainable. From FIG. 3, it is seen that when the wire is returned to room temperature after the first time heating with a short time current passage, a recovery stress of more than 100 Pa can be obtained.

As compared with the conventional method in which a TiNi wire is pre-strained by drawing and is subsequently embedded in a matrix while being fixed, the method of the present invention in which a cold working is performed gives an effect of providing increased strengths and rigidity at room temperature.

Figure 5:
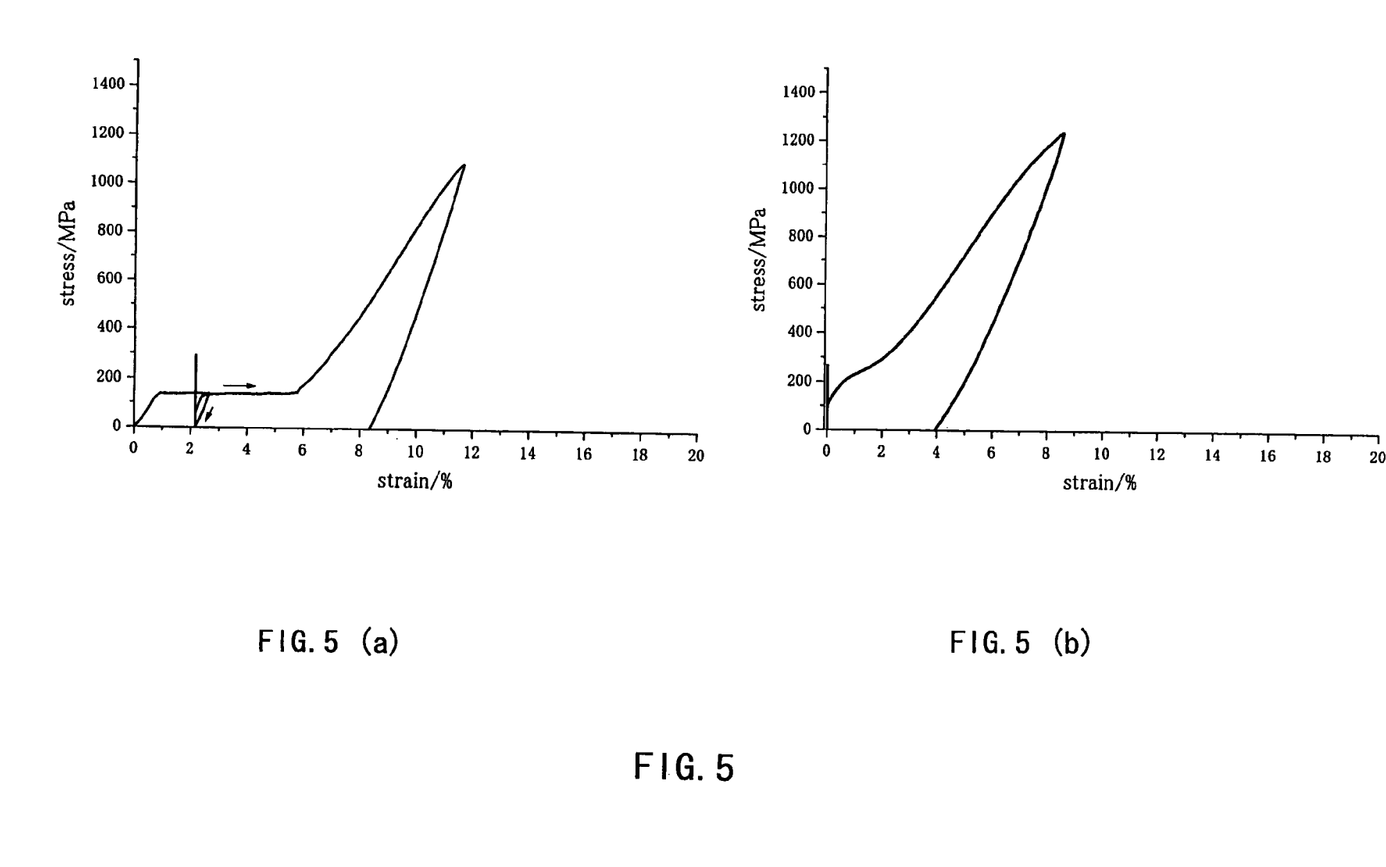

FIG. 5(a) shows a stress-strain relationship measured by a tensile test of a sample wire, simulative of the conventional method, obtained by pre-straining a Ti-50 at % Ni alloy annealed at 500° C. to have a pre-strain of 2% and, thereafter, heating the alloy under constrained state, followed by cooling to room temperature. It is seen that the yield stress 200 MPa or less and the stress increase is only slight even at a train of 4%.

On the other hand, FIG. 5(b) shows a stress-strain relationship at room temperature of a sample wire obtained by treating a Ti-50 at % Ni wire, having a cold working rate of 35% and the same composition as above, at 130° C. for 2 hours and, thereafter, heating the wire under constrained state by passing an electric current therethrough for a short time. It has been found that, as compared with the case of FIG. 5(a), the stress yield by the tensile test is increased and that the stress greatly increases as an increase of the strain. The above results suggest that a cold worked TiNi wire can impart a significantly improved reinforcing effect at low temperatures to the composite material.

Any shape memory alloy may be used for the purpose of the present invention as long as the alloy is capable of assuming a martensite phase or an austenite phase through phase transformation temperatures.

In the present invention, the reverse transformation temperature of TiNi wires is increased to a temperature higher than a curing temperature for a matrix material such as CFRP, GFRP or an epoxy resin by suitable cold working of the TiNi wires. Thus, the TiNi wires can be embedded in the resin without fixing both ends thereof and without causing reverse transformation of the TiNi wires during the curing.

Further, the reverse transformation temperature of the TiNi wires can be returned to the normal state by heating the TiNi wires by passing an electric current therethrough for a short time. Thus, it is possible to prepare a functional composite material which permits the utilization of shape memory effect of the TiNi wires.

Also, by utilizing only wire drawing in a wire production process in the cold working to generate a pre-strain therein and by adjusting the reverse transformation temperatures, the manufacturing costs are expected to be significantly reduced.

The resin matrix used for the purpose of the present invention is typically an epoxy resin. Other thermosetting resins such as phenol resins and polyamide resins may also be used as the resin matrix. Further, a thermoplastic resin may be usable if the desired strength is obtainable.

Embodiments of the present invention are as summarized below.

1. A functional composite material characterized in that shape memory alloy wires of a martensite phase surrounded by a resin matrix are molded and in that the shape memory alloy wires are prepared by subjecting a shape memory alloy, assumable a martensite phase or an austenite phase through phase transformation temperatures, to plastic deformation by a cold drawing work and has a reverse transformation starting temperature of 130° C. or higher.

2. A functional composite material as recited in the above item 1, characterized in that the shape memory alloy wires of the martensite phase has been worked to have a drawing rate of at least 10%.

3. A functional composite material as recited in the above item 1 or 2, wherein one or at least two members selected from the group consisting of carbon fiber-reinforced plastics and glass fiber-reinforced plastics are used in addition to the shape memory alloy wires.

4. A functional composite material as recited in any one of the above items 1-3, wherein the shape memory alloy is a Ti-Ni based alloy.

5. A functional composite material as recited in the above item 4, wherein the Ti-Ni based alloy is Ti-49.54 at % Ni, Ti-50 at % Ni or Ti-50.5 at % Ni.

6. A functional composite material as recited in any one of the above items 1-5, wherein an electric current is passed through the shape memory alloy wires to heat the wires to a temperature above the reverse transformation temperature thereof and to cause martensite reverse transformation to occur so that the reverse transformation temperature is normalized, and wherein the wires are subsequently heated to a temperature above the phase transformation temperature so that a shrinking force is generated in the wires.

7. A functional composite material as recited in the above item 6, wherein the electric current is passed through a part of the shape memory alloy wires so that a shrinking force is generated in the part of the wires.

8. A method of preparing a functional composite material, characterized in that shape memory alloy wires which have been subjected to a cold drawing work are embedded in a resin matrix and molded at a molding temperature lower than the phase transformation temperature.

9. A method of preparing a functional composite material as recited in the above item 8, wherein the molding temperature is in the range of 100-130° C.

10. A method of preparing a functional composite material as recited in the above item 8 or 9, wherein a carbon fiber-reinforced plastics or a glass fiber-reinforced plastic is used in conjunction with the shape memory alloy wires.

11. A method of preparing a functional composite material as recited in the above item 6 or 7, wherein an electric current is passed through the shape memory alloy wires for a short time to heat the wires, which have been subjected to the cold drawing work and embedded in the resin matrix to a temperature above the reverse transformation temperature thereof, and wherein, immediately after reverse transformation has occurred, the electric current is off to minimize adverse influence of heat upon the resin matrix.

EXAMPLE

Specific examples of the present invention will be next described.

Ti-50 at % Ni wires (diameter: 0.4 mm) with a cold working rate of 35% were surface-treated (with an acid (HF or $HNO_3$)) and embedded in CFRP (carbon fiber-reinforced plastic) to obtain a functional composite material having damage suppressing and vibration controlling properties.

Figure 6:
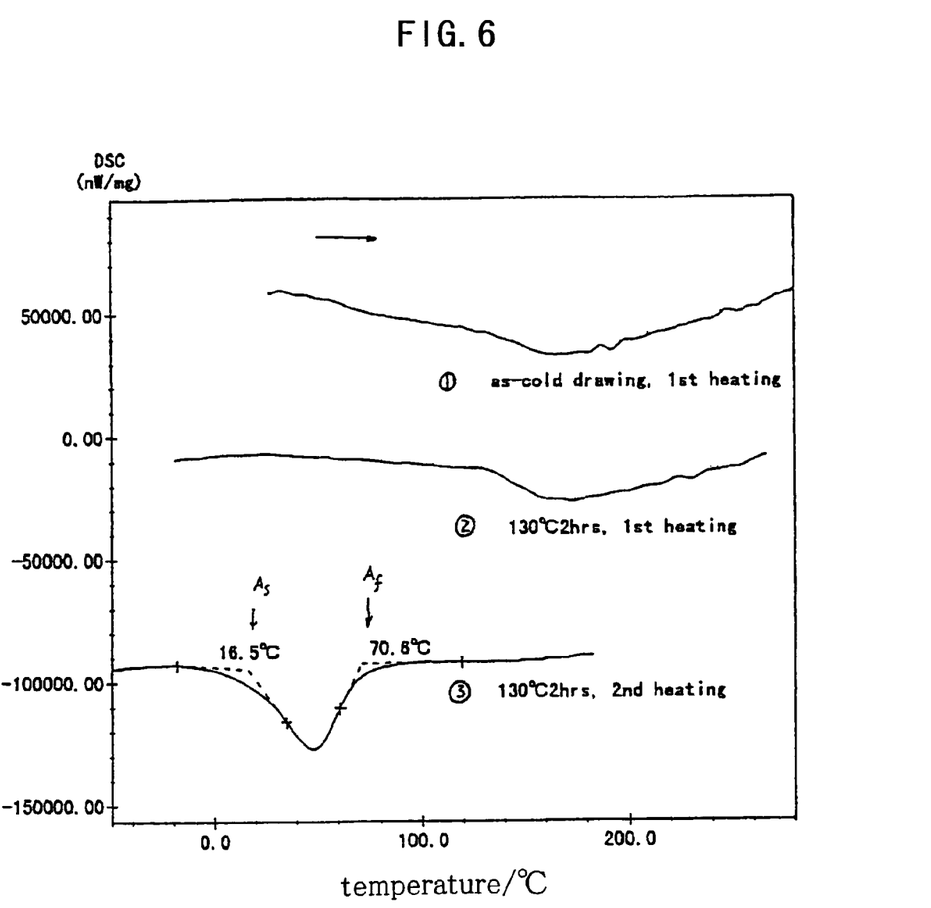
FIG. 6 shows the results of measurement, by a differential scanning thermometer, for reverse transformation temperature of a cold worked Ti-50 at % Ni alloy treated at 130° C. for 2 hours. The curve ① shows the results of measurement after a first time heating of as-cold worked sample; ② shows the results of measurement after a first time heating of a sample cold worked and thereafter heat-treated at 130° C. for 2 hours; and ③ shows the results of measurement after a second time heating of the sample cold worked and thereafter heat-treated at 130° C. for 2 hours.

The molding conditions for CFRP were at 130° C. for 2 hours. Thus, a cold-worked wire was held at 130° C. for 2 hours and thereafter measured for changes of the reverse transformation temperature. The results are shown in FIG. 6. From the results, it was confirmed that the cold-worked wire scarcely underwent reverse transformation even when treated at 130° C. for 2 hours.

Similar wires treated at 130° C. for 2 hours were heated under constrained state by passing various electric currents and measured for recovery stress and surface temperature thereof so as to obtain an optimum current passage method. The results are shown in FIGS. 7 and 8, from which it is seen that the Ti-50 at % Ni wire having a cold working rate of 35% and embedded in CFRP gives a stable shrinking stress of about 220 MPa when heated by current passage.

Figure 7:
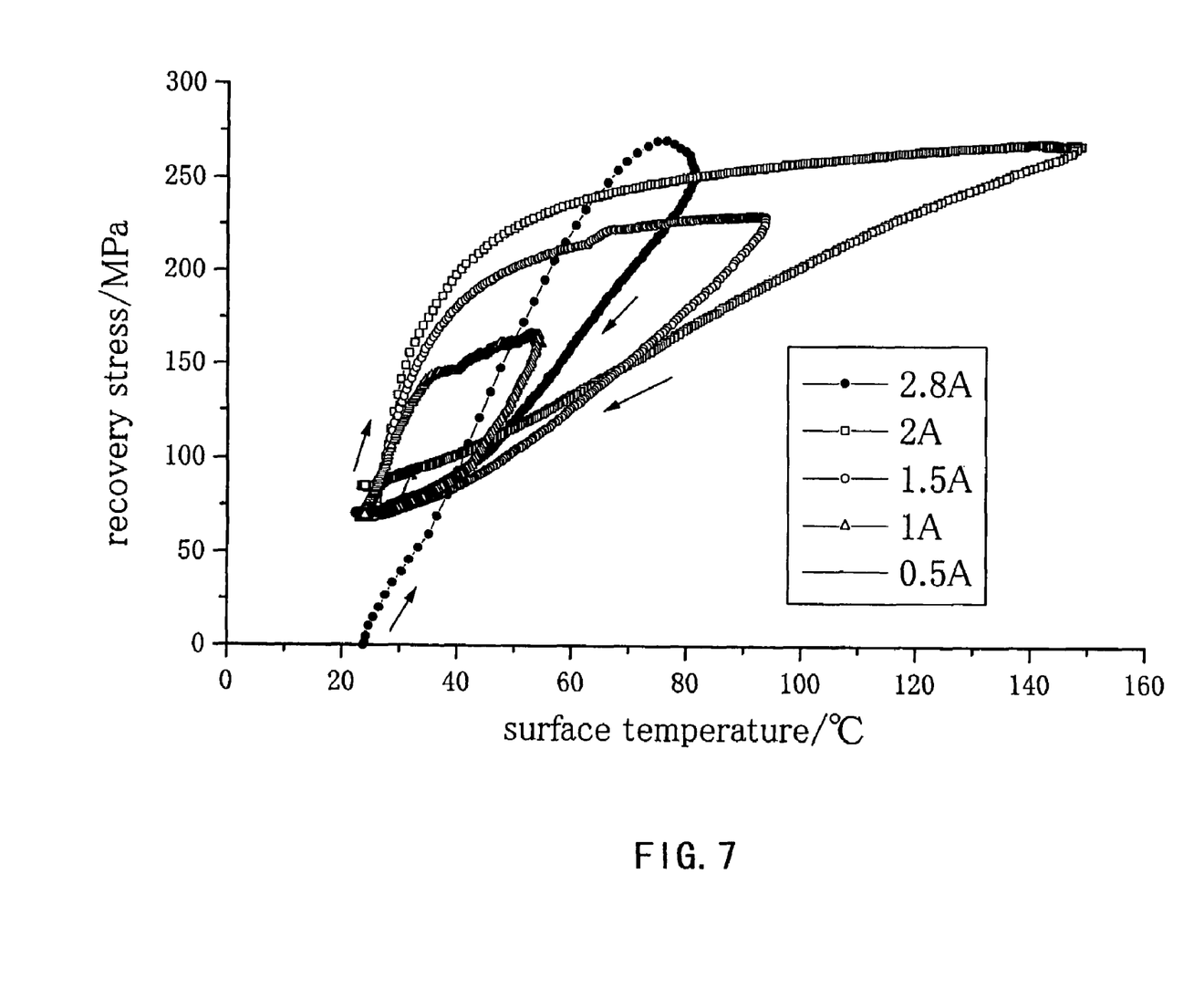
FIG. 7 shows the results of measurement for recovery stress and wire surface temperature of a wire, cold worked, then treated at 130° C. for 2 hours and subsequently heated by passing various electric currents, while constraining the wire, during the cooling of the wire after stopping the currents.
Figure 8:
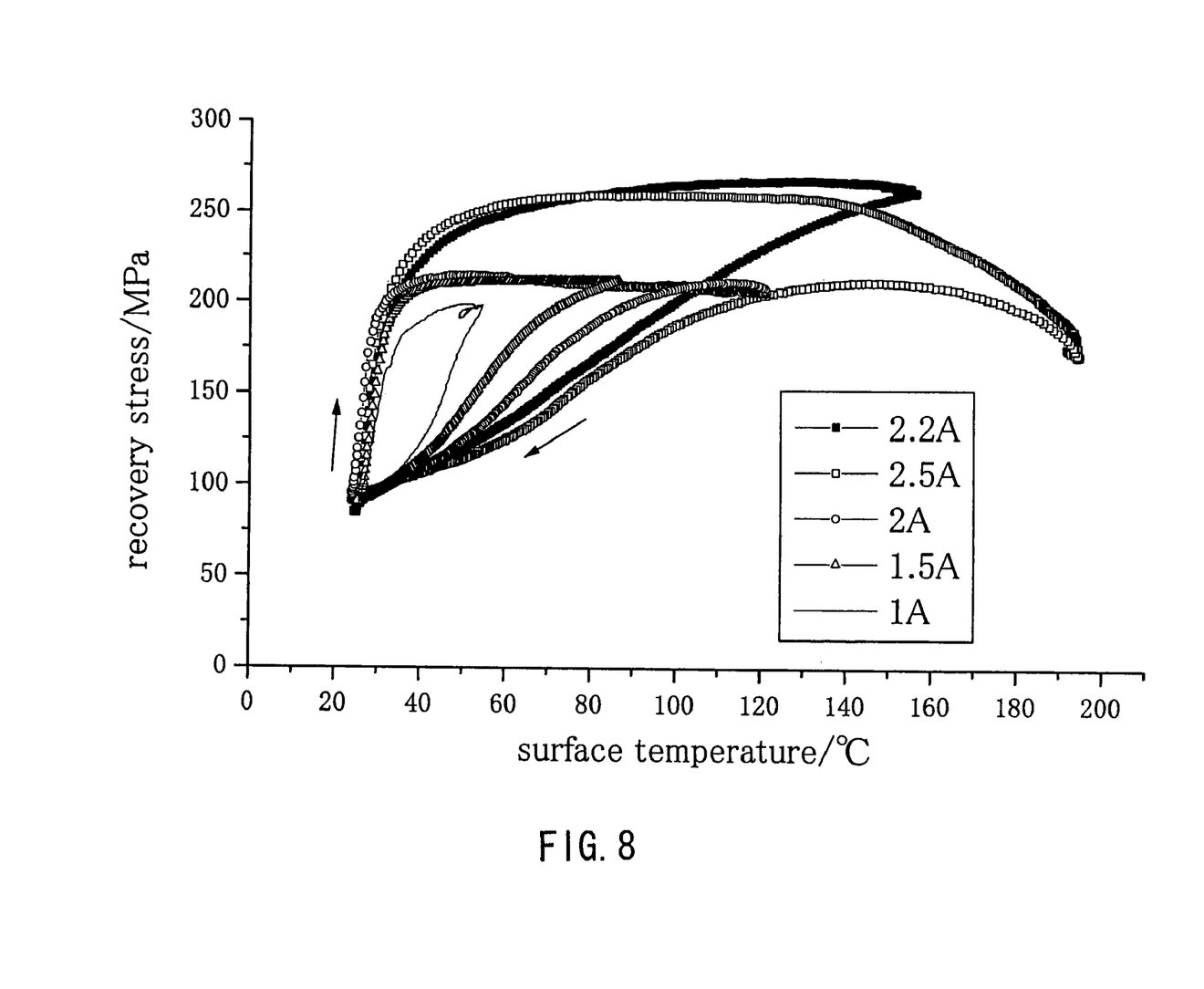
FIG. 8 shows the results of measurement for recovery stress and wire surface temperature of a wire, cold worked, then treated at 130° C. for 2 hours, subsequently heated by passing an electric current of 2.8 A for 2 seconds and finally heated by passing various electric currents, during the cooling of the wire after stopping the currents.

Further, from FIGS. 7 and 8, it is seen that, after the first time short time heating by current passage, a recovery stress of about 70 MPa can be obtained at room temperature. Thus, it is found that when the cold-worked wire embedded in CFRP is heated by passing a suitable electric current therethrough for a short period of time, a certain degree of shrinking stress is generated at room temperature, indicating that damage suppressing property is imparted to the material.

Figure 9:
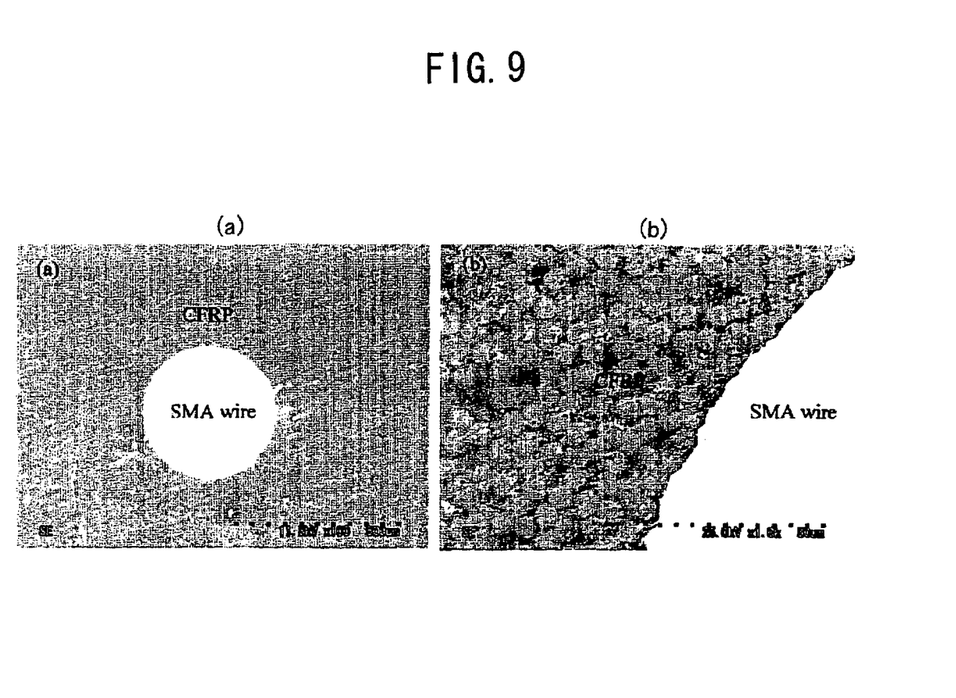
FIG. 9(a) shows the result of observation with SEM of a sectional area of CFRP in which a wire is embedded.
FIG. 9(b) shows an enlarged view of a boundary region between the wire and the CFRP.

FIG. 9(*a*) shows the result of observation with SEM of a sectional area of CFRP in which a wire was embedded, and FIG. 9(*b*) shows an enlarged view of a boundary region between the wire and the CFRP. It is confirmed that the heating by short time passage of an electric current of 3 A does not bring about the melting of the matrix resin or formation of cracks in the boundary.

INDUSTRIAL APPLICABILITY

According to the present invention in which the reverse transformation temperature and pre-strain of a shape memory alloy are controlled by cold working and heat treatment by current passage, it is possible to obtain a functional composite material permitting the utilization of a stable recovery force of a shape memory alloy without using a device for fixing both ends of the alloy for retaining the pre-strain thereof. According to the present invention, it is possible to prepare various shapes and sizes of functional composite materials using a shape memory alloy. In the present invention, since only wire drawing in a wire production process is utilized to generate a pre-strain in the shape memory wire, the manufacturing costs can be significantly reduced.

The invention claimed is:

1. A process for producing a functional, martensite reverse-transformed composite material, the process comprising:
    a) cold drawing a shape memory Ti—Ni based alloy, transformable between a martensite phase and an austenite phase at phase transformation temperatures, for plastic deformation to produce cold-drawn shape memory alloy wires having a martensite reverse transformation starting temperature of at least 130° C.;
    b) then molding said cold-drawn shape memory alloy wires in a martensite phase surrounded by a resin matrix to form a composite material;
    c) then curing said resin matrix; and
    d) then passing electric current through said cold-drawn shape memory alloy wires, embedded within said cured resin matrix, to heat said wires to a temperature above the reverse transformation temperature and to cause martensite reverse transformation to occur so that the reverse transformation temperature is normalized.

2. A method of preparing a functional, martensite reverse-transformed composite material as recited in claim 1, wherein said resin matrix includes an epoxy resin.

3. A method of preparing a functional, martensite reverse-transformed composite material as recited in claim 1, wherein the resin matrix is a carbon fiber-reinforced plastic or a glass fiber-reinforced plastic.

4. A method of preparing a functional, martensite reverse-transformed composite material as recited in claim 1, further comprising, immediately after reverse transformation has occurred, culling off the electric current to minimize adverse influence of heat upon the resin matrix.

* * * * *

UNITED STATES PATENT AND TRADEMARK OFFICE
CERTIFICATE OF CORRECTION

| | | |
|---|---|---|
| PATENT NO. | : 7,253,219 B2 | Page 1 of 1 |
| APPLICATION NO. | : 10/478967 | |
| DATED | : August 7, 2007 | |
| INVENTOR(S) | : Ya Xu et al. | |

It is certified that error appears in the above-identified patent and that said Letters Patent is hereby corrected as shown below:

Column 8, line 43 (claim 4, line 4), "culling" should read -- cutting --.

Signed and Sealed this

Thirteenth Day of November, 2007

JON W. DUDAS
*Director of the United States Patent and Trademark Office*